(12) United States Patent
Filatov

(10) Patent No.: US 8,102,088 B2
(45) Date of Patent: Jan. 24, 2012

(54) GENERATING ELECTROMAGNETIC FORCES WITH FLUX FEEDBACK CONTROL

(75) Inventor: Alexei V. Filatov, Fullerton, CA (US)

(73) Assignee: Calnetix Technologies, L.L.C., Cerritos, CA (US)

( * ) Notice: Subject to any disclaimer, the term of this patent is extended or adjusted under 35 U.S.C. 154(b) by 549 days.

(21) Appl. No.: 12/358,172

(22) Filed: Jan. 22, 2009

(65) Prior Publication Data

US 2009/0201111 A1    Aug. 13, 2009

Related U.S. Application Data

(60) Provisional application No. 61/023,780, filed on Jan. 25, 2008.

(51) Int. Cl.
*H02K 7/09* (2006.01)
*F16C 32/04* (2006.01)

(52) U.S. Cl. ...................... 310/90.5; 310/68 B
(58) Field of Classification Search .............. 310/68 B, 310/90.5
See application file for complete search history.

(56) References Cited

U.S. PATENT DOCUMENTS

| | | |
|---|---|---|
| 1,916,256 A | 7/1933 | Chandeysson |
| 2,276,695 A | 3/1942 | Lavarello |
| 2,345,835 A | 4/1944 | Serduke |
| 2,409,857 A | 10/1946 | Hines et al. |
| 2,917,636 A | 12/1959 | Akeley |
| 3,060,335 A | 10/1962 | Greenwald |
| 3,064,942 A | 11/1962 | Martin |
| 3,439,201 A | 4/1969 | Levy et al. |
| 3,943,443 A | 3/1976 | Kimura et al. |
| 4,127,786 A | 11/1978 | Volkrodt |
| 4,170,435 A | 10/1979 | Swearingen |
| 4,260,914 A | 4/1981 | Hertrich |
| 4,358,697 A | 11/1982 | Liu et al. |
| 4,362,020 A | 12/1982 | Meacher et al. |
| 4,415,024 A | 11/1983 | Baker |

(Continued)

FOREIGN PATENT DOCUMENTS

DE    102006004836 A1    5/2007

(Continued)

OTHER PUBLICATIONS

U.S. Appl. No. 13/116,991, filed May 26, 2011, Filatov.

(Continued)

*Primary Examiner* — Quyen Leung
*Assistant Examiner* — David W. Scheuermann
(74) *Attorney, Agent, or Firm* — Fish & Richardson P.C.

(57) ABSTRACT

An electromagnetic actuator with flux feedback control includes two poles located on opposite sides of a soft-magnetic target. A bias flux is introduced that flows into both poles. Magnetic circuitry may be designed so that the total bias flux is independent or substantially independent of a position of the target with respect to the poles or the control flux. The electromagnetic actuator also includes flux sensors introduced into each gap between the poles and the target. The electromagnetic actuator further includes an actuator control circuit to command the current in the control coil to bring a difference between the readings of the two flux sensors to a targeted level. In some aspects, the force exerted on the actuator target in this arrangement may be proportional to the command signal regardless of the position of the actuator target, MMF drop in the soft-magnetic parts of the magnetic circuit, or the frequency.

20 Claims, 13 Drawing Sheets

U.S. PATENT DOCUMENTS

| | | | |
|---|---|---|---|
| 4,635,712 A | 1/1987 | Baker et al. | |
| 4,642,501 A * | 2/1987 | Kral et al. | 310/90.5 |
| 4,659,969 A | 4/1987 | Stupak | |
| 4,740,711 A | 4/1988 | Sato et al. | |
| 5,003,211 A | 3/1991 | Groom | |
| 5,083,040 A | 1/1992 | Whitford et al. | |
| 5,241,425 A | 8/1993 | Sakamoto et al. | |
| 5,315,197 A | 5/1994 | Meeks et al. | |
| 5,481,145 A | 1/1996 | Canders et al. | |
| 5,514,924 A * | 5/1996 | McMullen et al. | 310/90.5 |
| 5,559,379 A | 9/1996 | Voss | |
| 5,589,262 A | 12/1996 | Kiuchi et al. | |
| 5,627,420 A | 5/1997 | Rinker et al. | |
| 5,672,047 A | 9/1997 | Birkholz | |
| 5,739,606 A | 4/1998 | Takahata et al. | |
| 5,767,597 A | 6/1998 | Gondhalekar | |
| 5,942,829 A * | 8/1999 | Huynh | 310/178 |
| 5,994,804 A | 11/1999 | Grennan et al. | |
| 6,087,744 A | 7/2000 | Glauning | |
| 6,130,494 A * | 10/2000 | Schob | 310/90.5 |
| 6,148,967 A | 11/2000 | Huynh | |
| 6,167,703 B1 | 1/2001 | Rumez et al. | |
| 6,191,511 B1 | 2/2001 | Zysset | |
| 6,259,179 B1 * | 7/2001 | Fukuyama et al. | 310/90.5 |
| 6,268,673 B1 | 7/2001 | Shah et al. | |
| 6,270,309 B1 | 8/2001 | Ghetzler et al. | |
| 6,304,015 B1 | 10/2001 | Filatov et al. | |
| 6,313,555 B1 | 11/2001 | Blumenstock et al. | |
| 6,325,142 B1 | 12/2001 | Bosley et al. | |
| 6,359,357 B1 | 3/2002 | Blumenstock | |
| 6,437,468 B2 | 8/2002 | Stahl et al. | |
| 6,465,924 B1 | 10/2002 | Maejima | |
| 6,664,680 B1 | 12/2003 | Gabrys | |
| 6,700,258 B2 * | 3/2004 | McMullen et al. | 310/90.5 |
| 6,727,617 B2 | 4/2004 | McMullen et al. | |
| 6,794,780 B2 * | 9/2004 | Silber et al. | 310/90.5 |
| 6,856,062 B2 | 2/2005 | Heiberger et al. | |
| 6,876,194 B2 | 4/2005 | Lin et al. | |
| 6,885,121 B2 | 4/2005 | Okada et al. | |
| 6,897,587 B1 | 5/2005 | McMullen et al. | |
| 6,925,893 B2 | 8/2005 | Abe et al. | |
| 6,933,644 B2 | 8/2005 | Kanebako | |
| 7,042,118 B2 | 5/2006 | McMullen et al. | |
| 7,557,480 B2 * | 7/2009 | Filatov | 310/90.5 |
| 2001/0030471 A1 | 10/2001 | Kanebako | |
| 2005/0093391 A1 | 5/2005 | McMullen et al. | |
| 2007/0056285 A1 | 3/2007 | Brewington | |
| 2007/0063594 A1 | 3/2007 | Huynh | |
| 2007/0164627 A1 | 7/2007 | Brunet et al. | |
| 2007/0200438 A1 | 8/2007 | Kaminski et al. | |
| 2007/0296294 A1 | 12/2007 | Nobe et al. | |
| 2008/0211355 A1 | 9/2008 | Sakamoto et al. | |
| 2008/0246373 A1 | 10/2008 | Filatov | |
| 2008/0252078 A1 | 10/2008 | Myers | |
| 2009/0004032 A1 | 1/2009 | Kaupert | |
| 2010/0090556 A1 | 4/2010 | Filatov | |
| 2010/0117627 A1 | 5/2010 | Filatov | |
| 2010/0301840 A1 | 12/2010 | Filatov | |
| 2011/0101905 A1 | 5/2011 | Filatov | |
| 2011/0163622 A1 | 7/2011 | Filatov et al. | |

FOREIGN PATENT DOCUMENTS

| | | |
|---|---|---|
| EP | 0774824 | 5/1997 |
| EP | 1905948 | 4/2008 |
| GB | 2225813 | 6/1990 |
| JP | 63277443 | 11/1988 |
| JP | 2006136062 A | 5/2006 |

OTHER PUBLICATIONS

U.S. Appl. No. 13/045,379, filed Mar. 10, 2011, Filatov.

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Turboden—Organic Rankine Cycle, "Turboden High Efficiency Rankine for Renewable Energy and Heat Recovery," (2 pages), available at http://www.turboden.it/orc.asp, 1999-2003, printed Jul. 27, 2006.

Turboden—Applications, "Turboden High Efficiency Rankine for Renewable Energy and Heat Recovery," (1 page), available at http://www.turboden.it/applications_detail_asp?titolo-Heat+recovery, 1999-2003, printed Jul. 27, 2006.

Honeywell, "Genetron® 245fa Applications Development Guide," (15 pages), 2000.

Hawkins, Lawrence A. et al., "*Analysis and Testing of a Magnetic Bearing Energy Storage Flywheel with Gain-Scheduled, Mimo Control*," Proceedings of ASME Turboexpo 2000, Munich, Germany, May 8-11, 2000, pp. 1-8.

McMullen, Patrick T. et al., "*Combination Radial-Axial Magnetic Bearing*," Seventh International Symposium on Magnetic Bearings, ETH Zurich, Aug. 23-25, 2000, pp. 473-478.

Hawkins, Lawrence et al., "*Shock and Vibration Testing of an AMB Supported Energy Storage Flywheel*," $8^{th}$ International Symposium on Magnetic Bearings, Mito, Japan, Aug. 26-28, 2002, 6 pages.

McMullen, Patrick T. et al., "*Design and Development of a 100 KW Energy Storage Flywheel for UPS and Power Conditioning Applications*," $24^{th}$ International PCIM Conference, Nuremberg, Germany, May 20-22, 2003, 6 pages.

Hawkins, Larry et al., "*Development of an AMB Energy Storage Flywheel for Industrial Applications*," $7^{th}$ International Symposium on Magnetic Suspension Technology, Fukoka, Japan, Oct. 2003, 5 pages.

Freepower FP6,. "Freepower FP6 Specification & Dimensions for 6kWe Electricity Generating Equipment," (2 pages), 2000-2004, printed Jul. 26, 2006.

Hawkins, Larry et al., "*Development of an AMB Energy Storage Flywheel for Commercial Application*," International Symposium on Magnetic Suspension Technology, Dresden, Germany, Sep. 2005, 5 pages.

Freepower ORC Electricity Company with Industrial Processes, "Industrial Processes," (1 page), available at http://www.freepower.co.uk/site-5.htm, 2000-2006, printed Jul. 26, 2006.

Freepower ORC Electricity Company FP6 Product Description, "FP6," (1 page), available at http://www.freepower.co.uk/fp6.htm, 2000-2006, printed Jul. 26, 2006.

Freepower ORC Electricity Company FP120 Product Description, "FP120," (1 page), available at http://www.freepower.co.uk/fp120.htm, 2000-2006, printed Jul. 26, 2006.

Freepower ORC Electricity Company FP60 Product Description, "FP60," (1 page), available at http://www.freepower.co.uk/fp60.htm, 2000-2006, printed Jul. 26, 2006.

Freepower ORC Electricity Company Products Technical Overview "A System Overview," (1 page), available at http://www.freepower.co.uk/tech-overview.htm, 2000-2006, printed Jul. 26, 2006.

Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.

Huynh, Co et al., "*Flywheel Energy Storage System for Naval Applications*," GT 2006-90270, Proceedings of GT 2006 ASME Turbo Expo 2006: Power for Land, Sea & Air, Barcelona, Spain, May 8-11, 2006, pp. 1-9.

Freepower ORC Electricity Company Home Page, "Welcome to Freepower," (1 page) available at http://www.freepower.co.uk/, Jul. 18, 2006.

PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.

Ormat Web Site: "Recovered Energy Generation in the Cement Industry," (2 pages) available at http://www.ormat.com/technology_cement_2.htm, printed Jul. 26, 2006.

McMullen, Patrick et al., "*Flywheel Energy Storage System with AMB's and Hybrid Backup Bearings*," Tenth International Symposium on Magnetic Bearings, Martigny, Switzerland, Aug. 21-23, 2006, 6 pages.

International Search Report and Written Opinion of the International Searching Authority issued in International Application No. PCT/US2009/031837 on Sep. 7, 2009; 11 pages.

International Preliminary Report on Patentability issued in International Application No. PCT/US2009/031837 on Jul. 27, 2010, 6 pages.
International Search Report and Written Opinion of the International Searching Authority issued in International Application No. PCT/US2009/058816, mailed Jun. 10, 2010, 10 pages.
International Preliminary Report on Patentability issued in International Application No. PCT/US2009/058816 on Apr. 12, 2011, 5 pages.
Meeks, Crawford, "*Development of a Compact, Lightweight Magnetic Bearing*," 26th Annual AIAA/SAE/ASME/ASEE Joint Propulsion Conference, Jul. 16-18, 1990, 9 pages.

Ehmann et al., "*Comparison of Active Magnetic Bearings With and Without Permanent Magnet Bias*," Ninth International Symposium on Magnetic Bearings, Lexington, Kentucky, Aug. 3-6, 2004, 6 pages.
Office Action issued in U.S. Appl. No. 12/267,517 on Mar. 28, 2011, 9 pages.
Office Action issued in U.S. Appl. No. 12/569,559 on Apr. 25, 2011, 22 pages.
Notice of Allowance issued in U.S. Appl. No. 12/569,559 on Aug. 9, 2011, 9 pages.

\* cited by examiner

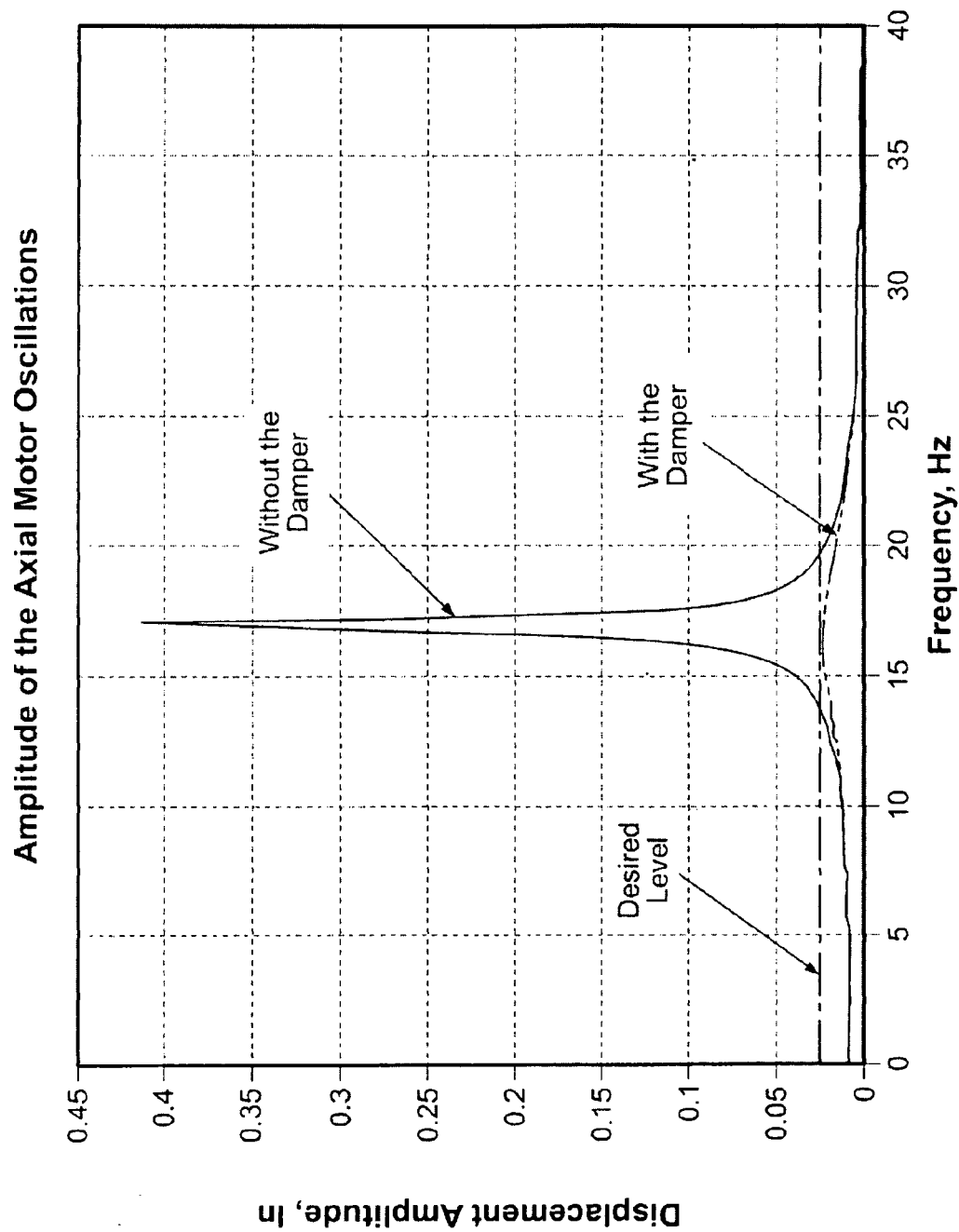

GENERATING ELECTROMAGNETIC FORCES WITH FLUX FEEDBACK CONTROL

CLAIM OF PRIORITY

This application claims priority under 35 U.S.C. §119 to U.S. Provisional Patent Application Ser. No. 61/023,780, filed on Jan. 25, 2008, the entire contents of which are hereby incorporated by reference.

TECHNICAL FIELD

The present disclosure relates to generating electromagnetic forces with flux feedback control.

BACKGROUND

This disclosure relates to generating electromagnetic forces through an electromagnetic actuator and, more particularly, to generating electromagnetic forces through an electromagnetic actuator with flux feedback control.

In certain electromagnetic actuators, such as, for example, electromagnetic actuators used in active magnetic bearings, an electromagnetic force may be assumed to be a known function of a control current. It may be desirable for this function to be a linear function in order, for instance, to simplify an algorithm for controlling the electromagnetic force. This linear function may be achieved by introducing a bias flux. The assumption that the electromagnetic force may be a known function of the control current may not, however, be entirely accurate. For example, the electromagnetic force may also depend on a rotor position due to the negative stiffness directly associated with the presence of the bias flux. Further, the electromagnetic force may depend on a magneto-motive force (MMF) drop in one or more soft-magnetic parts of a magnetic circuit of the electromagnetic actuator, which may increase as the soft-magnetic part materials are brought closer to saturation. This may make the electromagnetic force a non-linear function of the current even if the bias flux is used. Also, the force may further depend on a frequency, especially when the soft-magnetic parts of the magnetic circuit are not laminated as in the case of, for example, an axial actuator.

SUMMARY

An embodiment of an electromagnetic actuator includes a body configured to move along an axis, a first pole adjacent and spaced apart from a first surface of the body, the first pole adapted to communicate magnetic flux with the first surface of the body, and a second pole adjacent and spaced apart from a second surface of the body, the second pole adapted to communicate magnetic flux with the second surface of the body. In embodiments, the body, the first pole, and the second pole are magnetically coupled and define a control magnetic circuit. A bias pole is adjacent and spaced apart from a lateral surface of the body, the bias pole adapted to communicate magnetic flux with the lateral surface of the body. The body, the first pole, and the bias pole define a first bias magnetic circuit, and the body, the second pole, and the bias pole define a second bias magnetic circuit. The electromagnetic actuator can include a control coil proximate to the first and second poles, adapted to produce a control magnetic flux in the control magnetic circuit. A first flux sensor is configured to measure a total magnetic flux between the first pole and the first surface of the body; a second flux sensor is configured to measure a total magnetic flux between the second pole and the second surface of the body. A control coil is in communication with the magnetic control circuit, and is adapted to produce a magnetic control flux in the magnetic control circuit. A controller is coupled to the control coil configured to adjust the control magnetic flux in the control magnetic circuit based on the total fluxes measured by the first and second flux sensors and a command signal.

An embodiment includes communicating first bias magnetic flux through a first surface of the body, communicating second bias magnetic flux through a second surface of the body, communicating a control magnetic flux through the first and second surfaces of the body, measuring the flux communicated through the first and second surfaces, and adjusting the control magnetic flux based on the measured fluxes and a command signal.

In an embodiment, an electric machine system includes a first assembly that moves in relation to a second assembly along an axis of movement. A first structure is fixed in relation to the second assembly, is adjacent and spaced apart from a first face of the first assembly, and is magnetically coupled with the first face of the first assembly. A second structure fixed in relation to the second assembly, is adjacent and spaced apart from a second face of the first assembly, and is magnetically coupled with the second face of the first assembly. The first assembly, the first structure, and the second structure define a control magnetic circuit. A conductive coil is fixed in relation to the second assembly and is adapted to produce a magnetic flux in the control magnetic circuit. A soft-magnetic pole is adjacent and spaced apart from a surface of the first assembly, and is magnetically coupled with the surface of the first assembly. The first assembly, the first structure, and the soft-magnetic pole define a first bias magnetic circuit, and the first assembly, the second structure, and the soft-magnetic pole define a second bias magnetic circuit. A first sensor is configured to measure a first total magnetic flux, where the first total magnetic flux corresponds to a sum of the control magnetic flux and a first bias magnetic flux in the first bias magnetic circuit. A second sensor is configured to measure a second total magnetic flux, where the second total magnetic flux corresponds to a sum of the control magnetic flux and a second bias magnetic flux in the second bias magnetic circuit. An electronics module is configured to control current in the conductive coil to adjust the magnetic flux in the control magnetic circuit based on the total fluxes measured by the first and second flux sensors and a command signal.

Embodiments can include one or more of the following features. For example, embodiments can include a permanent magnet adjacent the bias pole and adapted to generate bias magnetic fluxes. Additionally, embodiments can include a first permanent magnet adapted to generate bias magnetic flux in the first bias magnetic circuit, and a second permanent magnet adapted to generate bias magnetic flux in the second bias magnetic circuit.

In embodiments, the body can comprise a low reluctance target adapted to communicate magnetic flux. The bias pole can be magnetically saturated. In other embodiments, the controller comprises a local actuator control circuit, the local actuator control circuit adapted to adjust current in the control coil based on the level of flux detected by the flux sensors and the command signal. The control magnetic flux is configured to oppose a deviation of the difference between the total fluxes measured in the first and second poles from a command signal. The first and second flux sensors can be Hall Effect sensors.

In embodiments, the bias pole is a radial bias pole adjacent and spaced apart from the lateral surface of the body. The first pole is a first radial pole and the first surface of the body is the lateral surface of the body. The lateral surface of the body, the first radial pole, and the radial bias pole define the first bias magnetic circuit. The second pole is a second radial pole and the second surface of the body is the lateral surface of the body, the lateral surface of the body, the second radial pole, and the radial bias pole define the second bias magnetic circuit. The first radial pole, the body and the second radial pole define the control magnetic circuit. A permanent magnet adjacent the radial bias pole can be used to generate bias magnetic fluxes.

Embodiments include a first radial control coil and a second radial control coil, the first radial control coil coiled around the first radial pole and the second radial control coil coiled around the second radial pole, where the first and the second radial control coils adapted to generate control magnetic flux in the control magnetic flux circuit.

In embodiments, the control magnetic flux is adjusted to oppose a deviation of the difference between the total fluxes measured in the first and second poles from a command signal. Embodiments include receiving the command signal, measuring the difference between the total fluxes in the first and second poles, communicating this difference to a controller, generating an input signal for a current amplifier based on the deviation of the measured total flux difference from a command signal, generating a current with a current amplifier that produces a control magnetic flux reducing a deviation of the difference in the total fluxes from the command signal.

In some embodiments the command signal is proportional to a velocity of the body with the opposite sign, forming a damper. The control magnetic flux can be adjusted proportionally to the measured difference of the total fluxes communicated through the first and second surfaces.

In embodiments, a velocity sensor is in communication with the electronics module, the velocity sensor being fixed in relation to the second assembly. The electronics module is adapted to receive a signal from the velocity sensor corresponding to a velocity of the first assembly. The first sensor is adjacent the first structure and the first face of the first assembly; and the second sensor is adjacent the second structure and the second face of the first assembly. In embodiments, the first assembly is a rotor that rotates about the axis of movement and the second assembly is a stator.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DESCRIPTION OF DRAWINGS

FIG. 9 is a graph showing amplitudes of the axial oscillations of the electric machine rotor resulting from the axial oscillations of a coupled rotor with a 0.01 inch amplitude.

DETAILED DESCRIPTION

This disclosure relates to generating electromagnetic forces through an electromagnetic actuator and, more particularly, to generating electromagnetic forces through an electromagnetic actuator with flux feedback control.

Although described in more general terms above, more specific examples of implementations of an electromagnetic actuator with flux feedback control are presented below.

Figure 1:
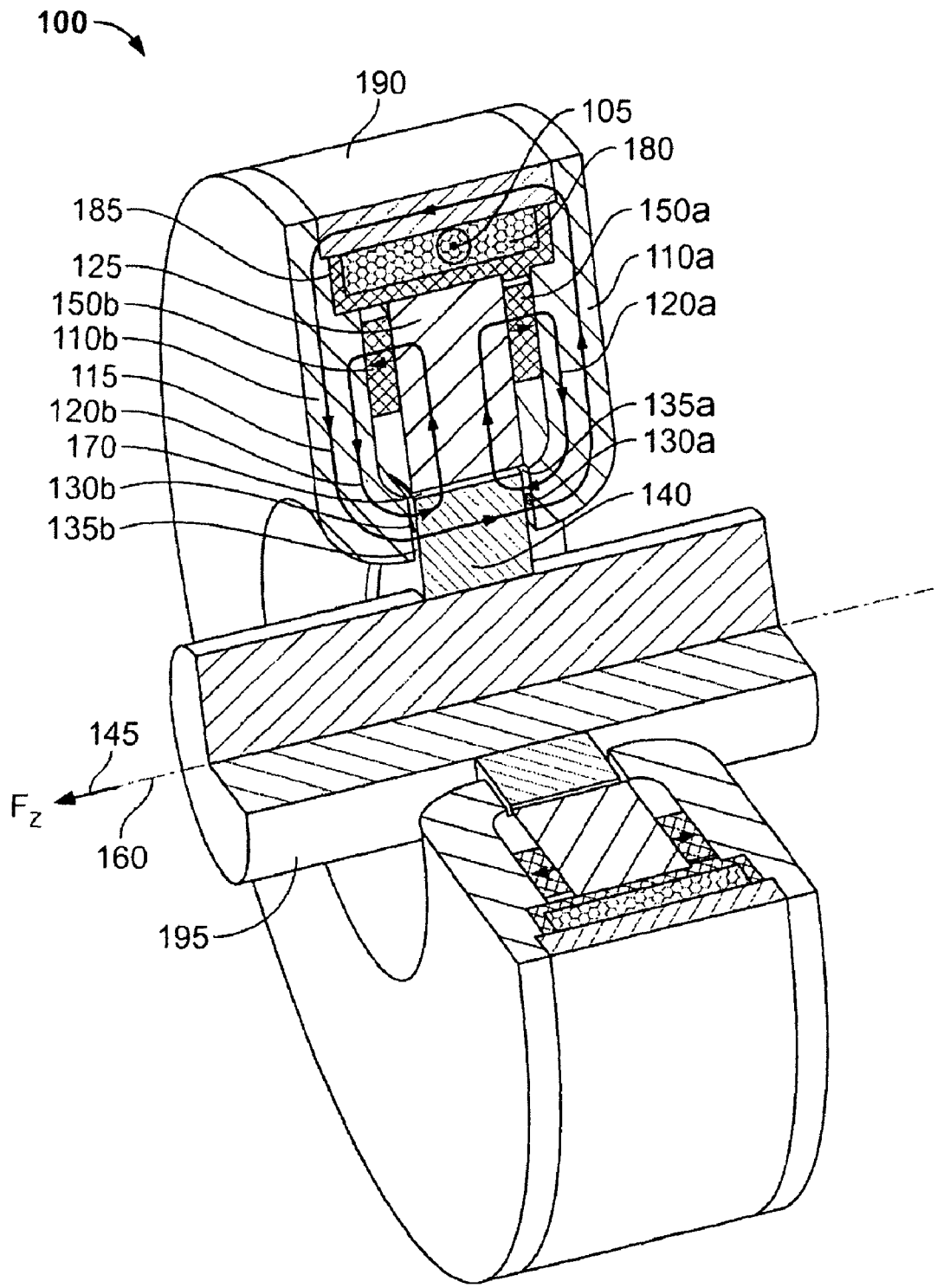
FIG. 1 is a schematic depicting a perspective cross-sectional view of an example electromagnetic actuator in accordance with the present disclosure.

As an example, FIG. 1 illustrates at least a portion of an electromagnetic actuator 100 in accordance with the present disclosure. Electromagnetic actuator 100 may be an axial electromagnetic actuator with flux feedback control. Electromagnetic actuator 100 can include axial poles 110a and 110b, radial bias flux pole 125, flux sensors 130a and 130b, actuator target 140, permanent magnets 150a and 150b, axial control winding 180 and axial backiron 190. In the embodiment, control winding 180 can be a single winding of conductive wire or a plurality of windings of conductive wire. Winding 180 can be wound around an insulating bobbin 185. In embodiments, the actuator target 140 can be concentric with the actuator axis 160 and separated from the axial poles 110a and 110b by axial air gaps 135a and 135b. The actuator target 140 can also be separated from the radial bias flux pole 125 by a radial air gap 170. Actuator target 140 can be coupled to shaft 195. Permanent magnets 150a and 150b may be attached by identical poles (e.g., south poles in FIG. 1) to the radial bias flux pole 125. These magnets 150a,b generate bias fluxes 120a and 120b that may flow through the axial poles 110a and 110b, cross the axial air gaps 135a and 135b, enter the actuator target 140, flow within the target 140 towards the radial air gap 170, cross the radial air gap 170, enter the radial bias flux pole 125, and complete the loop. In embodiments of actuator 100, when the axial control winding 180 is energized with a control current 105 it can produce a control flux 115 that can flow through the axial pole 110b, cross the axial air gap 135b, enter the actuator target 140, flow within the actuator target 140 towards the axial air gap 135a, cross the axial air gap 135a, continue its path within the axial pole 110a, and close the loop using the axial backiron 190.

The axial force 145 exerted on the actuator target 140 shown in FIG. 1 can be presented as $$F_z = \frac{A}{2\mu_0}(B_2 + B_1)(B_2 - B_1), \quad (1)$$

where $B_2$ and $B_1$ are densities of the total fluxes in the axial air gaps 135b and 135a, respectively, and A is an effective area of a face of the actuator target 140.

As it can be seen from FIG. 1, in the axial air gap 135b, the bias flux 120b and the control flux 115 can be added, while in the axial air gap 135a, the bias flux 120a and the control flux 115 can be subtracted from each other:

$$B_2 = B_{b2} + B_c; \quad B_1 = B_{b1} - B_c, \quad (2)$$

where $B_{b2}$ and $B_{b1}$ are the densities of the bias fluxes 120b and 120a in the axial air gaps 135b and 135a, respectively, and $B_c$ is the density of the control flux 115.

The density $B_c$ of the control flux 115 may be the same in both air gap 135b and 135a because the control flux 115 can be continuous and it does not have an alternative path to going through both air gaps 135b and 135a because permanent magnets 150a and 150b can have low permeability and, therefore, represent a large reluctance to the control flux flow.

The bias fluxes 120b and 120a in the air gaps 135b and 135a, as well as their densities $B_{b2}$ and $B_{b1}$, however, can be different because the total bias flux that enters the actuator target through the radial gap 170 may split between the axial gaps 135a and 135b, and the fluxes in these gaps do not have to be equal. For example, if the actuator target 140 is displaced from the central position in the positive Z direction, the air gap 135b can be smaller and the air gap 135a can be larger. Consequently, the bias flux 120b and the bias flux density $B_{b2}$ through the air gap 135b can be larger than the bias flux 120a and the bias flux density $B_{b1}$ through the air gap 135a.

Using (2), equation (1) can be rewritten as $$F_z = \frac{A}{2\mu_0}(B_{b1} + B_{b2})(B_2 - B_1). \quad (3)$$

Even though the bias fluxes 120b and 120a in the air gaps 135b and 135a, as well as their densities $B_{b2}$ and $B_{b1}$, can be different, their sum in the equation (3) can be made nearly constant by designing the radial bias pole 125 so that its material is magnetically saturated when the bias pole 125 is installed in the actuator 100. In this case, the net bias flux (sum of the bias fluxes 120a and 120b) can be equal to the product of the magnetic saturation flux density for the material of the radial bias flux pole 125 and the cross-sectional area of the radial bias flux pole 125. This net bias flux may, therefore, be independent or substantially independent of the operating conditions, including temperature, position of the actuator target 140, and control current 105. Therefore, the axial force $F_z$ 145 may be directly proportional to the difference in the flux densities $\Delta B = B_2 - B_1$ measured with flux sensors 130b and 130a installed between the axial air gaps 135b and 135a, respectively.

Figure 2:
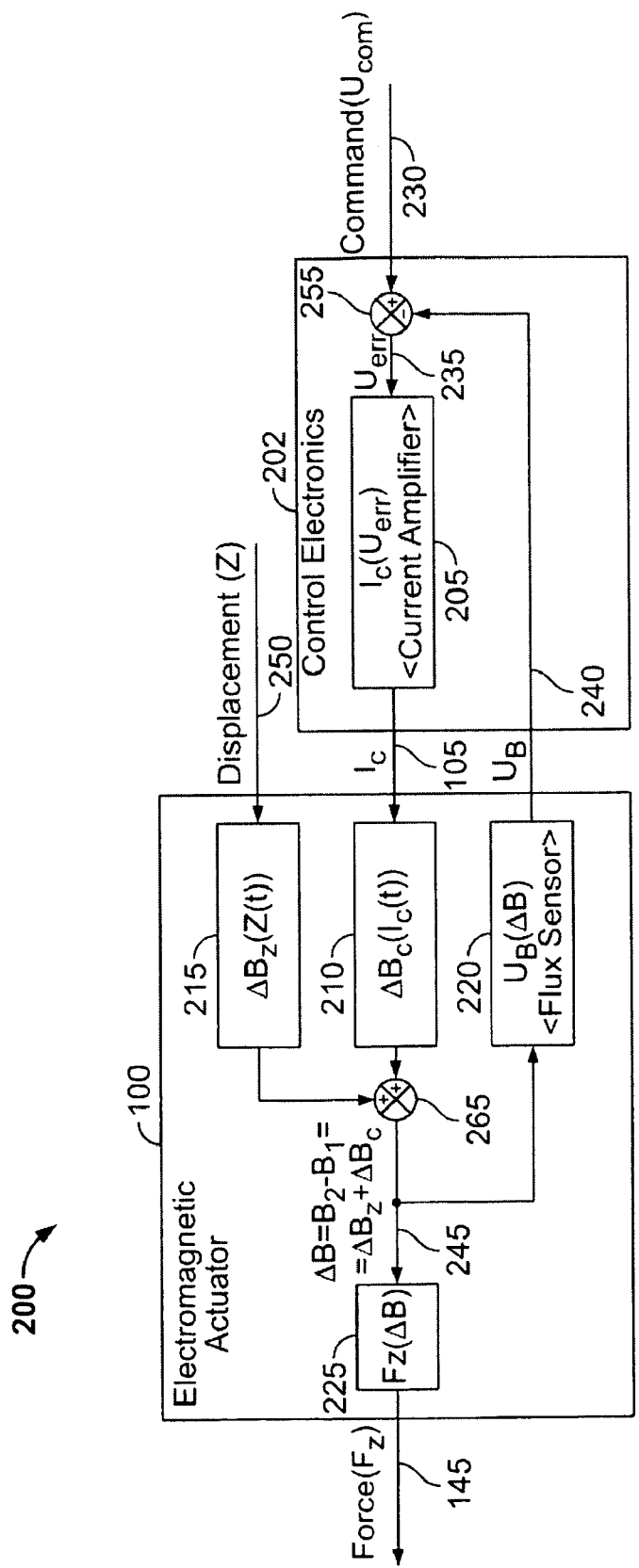
FIG. 2 is a diagram illustrating an example of a control loop to implement flux feedback in the axial actuator shown in FIG. 1.

A local actuator control loop 200, such as the one shown in FIG. 2, may be used to make the difference $\Delta B = B_2 - B_1$ 245 equal or substantially equal to an actuator input command $U_{com}$ 230 by adjusting the current $I_c$ 105 in control coil 180 through control electronics 202. Actuator control circuit 200 may command the current $I_c$ 105 in the control winding 180 to bring a difference between the readings of the two flux sensors 130a,b to a targeted level $\Delta B = B_2 - B_1$ 245. In some aspects, the force 145 exerted on the actuator target 140 in this arrangement may be proportional to the command signal $U_{com}$ 230 regardless of, for example, the position Z 250 of the actuator target 140, MMF drop in the soft-magnetic parts of the magnetic circuit, or the frequency f. As a further example, an electromagnetic actuator 100 with flux feedback control may generate an electromagnetic force proportional or substantially proportional to an actuator input command $U_{com}$ 230 and substantially independent of MMF drop in the magnetic circuit because the generated force 145 can remain a linear function of $\Delta B = B_2 - B_1$ 245 all the way up to the material saturation point, where it becomes a non-linear function of the control current 105.

A behavior of the electromagnetic actuator 100 in the block diagram shown in FIG. 2 is modeled by using several blocks representing relationships between physical parameters within the system. First of all, the output force of the actuator $F_Z$ 145 depends on the difference in the flux densities in two air gaps 135b and 135a: $\Delta B = B_2 - B_1$ (245). This dependence is represented by block 225. According to equation (3) this relationship is linear with a gain $$\frac{A}{2\mu_0}(B_{b2} + B_{b1}).$$

The flux density difference $\Delta B = B_2 - B_1$ 245 is a function of two parameters: actuator control current $I_c$ 105 and an axial displacement of the actuator target 140 from the central position Z 250: $\Delta B = \Delta B(I_c, Z)$. This function may be non-linear and may depend on the dynamics of Z 250 and $I_c$ 105. To reflect the effects of dynamics, Z 250 and $I_c$ 105 can be written as functions of time: Z(t) and $I_c$(t). Then, $\Delta B = \Delta B(I_c(t), Z(t))$. The function $\Delta B = \Delta B(I_c(t), Z(t))$ can be presented as a sum of two functions:

$$\Delta B(I_c(t), Z(t)) = \Delta B_c(I_c(t)) + \Delta B_z(Z(t))) \quad \text{(operation 265).}$$

The dependence of $F_Z$ 145 on the actuator target position Z 250 represented by the sequence of the blocks 215 and 225 is known as a "negative stiffness." For example, if the actuator target 140 is shifted in the positive Z direction and the current $I_c$ 105 is kept zero, then $B_2$ becomes larger than $B_1$ producing a force in the positive Z direction proportional to $\Delta B = B_2 - B_1$. This is opposite to an effect of a "positive stiffness," which is a characteristic of, for example, a mechanical spring, where the positive Z displacement results in a force acting in the negative Z direction. In an electromagnetic actuator with flux feedback control a force may be independent or substantially independent of the target position, i.e. an electromagnetic actuator with flux feedback control may exhibit a significantly smaller negative stiffness than in a conventional active magnetic bearing. Therefore, an electromagnetic actuator with flux feedback control may be used, for example, in a damper used in combination with a passive magnetic bearing which exhibits a low positive stiffness.

The magnetic flux densities $B_2$ and $B_1$ in the air gaps 135b and 135a are measured using flux sensors 130b and 130a. The difference between the output signals (typically voltages) of the flux sensors 130b and 130a is designated in FIG. 2 as $U_B$ (240). The dependence of $U_B$ 240 on $\Delta B$ 245 is presented by the block 220. Since the output signals of most flux sensors (such as Hall sensors) may be proportional to the density of the measured flux with a constant proportionality coefficient, the relation represented by the block 220 may be linear and independent of the system dynamics.

The output signal $U_B$ 240 from flux sensors 130a and 130b is fed into the control electronics 202. The other input for the control electronics 202 is the command signal $U_{com}$ 230. The output of the control electronics 202 is the control current $I_c$ 105. The closed control loop 200 operates to drive the error signal $U_{err}$ 235 to zero by adjusting the control current $I_c$ 105, which in turn, affects the difference in flux densities $\Delta B = B_2 - B_1$ 245. The input signal $U_{com}$ 230 can be adjusted by feedback signal $U_B$ 240 to establish the error signal $U_{err}$ 235 (operation 255). Having $U_{err} = U_{com} - U_B$ 235 equal to zero implies that $U_B$ 240 is equal to $U_{com}$ 230. Since the flux sensor block function 220 is linear and independent of the system dynamics, the difference in the flux densities $\Delta B = B_2 - B_1$ 245 will be simply proportional to the command voltage $U_{com}$ 230. Further, since the relation 225 described by the equation (3) may also be linear and independent of the system dynamics, the output force $F_Z$ 145 can also be proportional to the command voltage $U_{com}$ 230. The magnetic circuitry may be designed so that the sum of the bias fluxes 120a and 120b will be independent or substantially independent of, for instance, a position Z of the target 140 with respect to the poles 110a,b or the control flux 115.

Note, that as long as the control loop 200 in FIG. 2 is closed the output force $F_Z$ 145 may not be affected by the target displacement Z 250 since the current $I_c$ 105 can be automatically adjusted to compensate for the effects of Z on $\Delta B$ 245. In particular, if $U_{com}$ 230 is set to zero, then $\Delta B$ 245, and, consequently, $F_Z$ 145, will be maintained close to zero regardless of the rotor position Z. Increase of the displacement Z 250 may simply cause an increase of the control current $I_c$ 105 to counteract the effect of Z on $\Delta B$ 245. This means that the negative stiffness can be substantially eliminated in the actuator with a flux-feedback control.

$F_Z$ 145 also will not be affected by non-linearities and dynamics within the block 210, since the current $I_c$ 105 will be automatically adjusted to compensate for their effects, as well, and keep $F_Z$ 145 proportional to the command voltage $U_{com}$ 230. As yet another example, such an electromagnetic actuator may improve on conventional systems where although the force is assumed to depend on the current only, the force is, in reality, a function of such variables as axial position of the target, frequency, and MMF drop in the magnetic circuit.

The control electronics 202 is shown to contain only a Current Amplifier block 205, but it may also include any number of additional filters and signal conditioning units, both digital and analog, needed to realize the desired system dynamics.

An electromagnetic actuator with a flux feedback control, as described above, may produce a more uniform actuator transfer function, as compared to a conventional current-controlled electromagnetic actuator.

If, however, the local actuator control loop 200 in FIG. 2 is disabled (e.g., the flux sensor block 220 is eliminated), the actuator will operate in a conventional "current-control" mode. In this case, the force $F_Z$ 145 generated by the actuator will be an explicit function of two parameters: control current $I_c$ 105 and the actuator target position Z 250. It also will be affected by the system dynamics. Moreover, since the relationship "$\Delta B$ vs $I_c$" 210 is non-linear, the force $F_Z$ 145 may be a non-linear function of IC 105.

Figure 3:
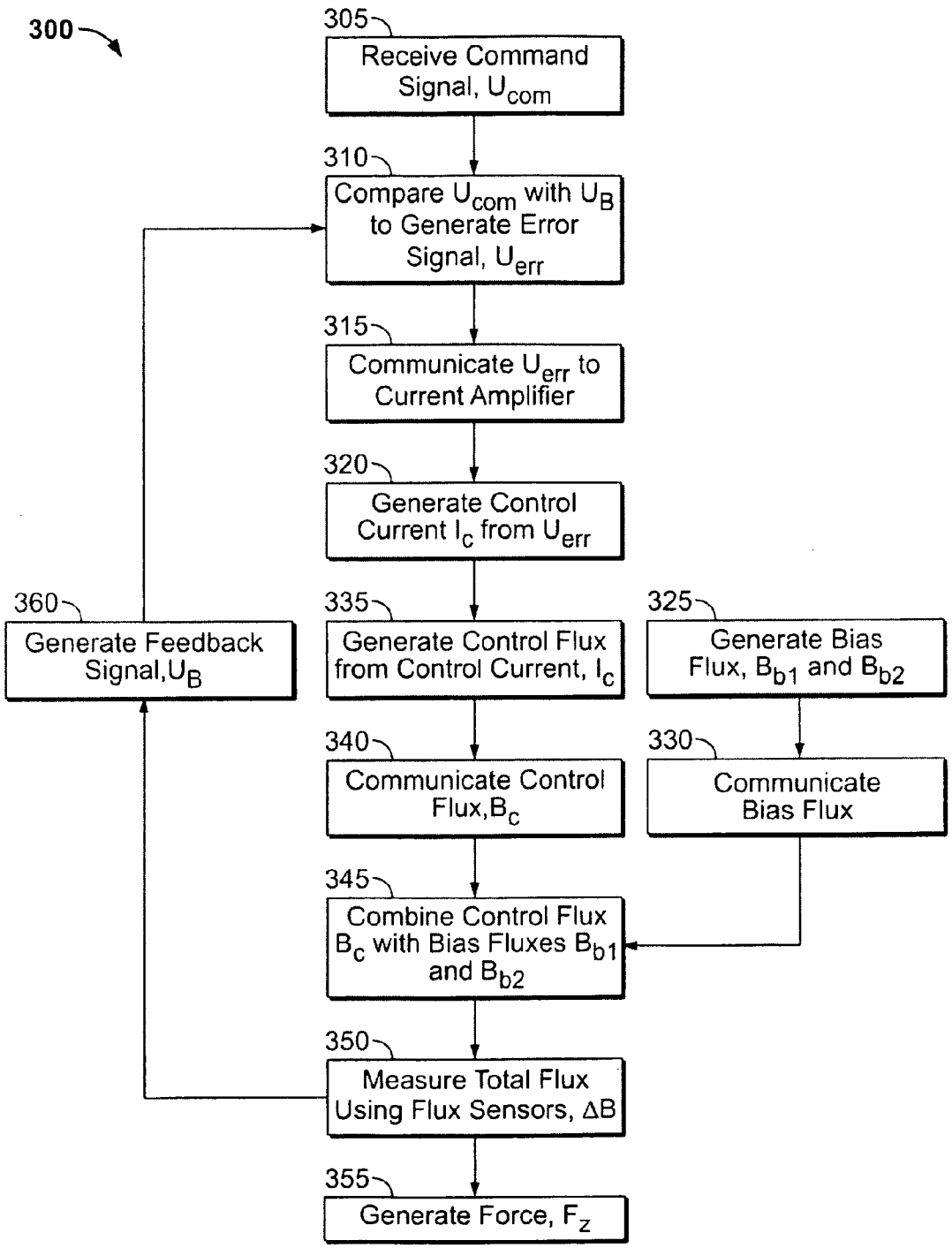
FIG. 3 is a flowchart illustrating an example process for generating a force with flux feedback.

FIG. 3 is a flowchart illustrating an example process for generating a force with flux feedback. In flowchart 300, representing one embodiment of the disclosure, a command signal $U_{com}$ 230 is received (block 305). The command signal $U_{com}$ 230 can be compared to a signal $U_B$ 240 corresponding to the flux density difference $\Delta B$ 245 to generate a signal $U_{err}$ (block 310). $U_{err}$ 235 is communicated to a current amplifier 205 (block 315) generating a control current $I_c$ 105 (block 320). The current $I_c$ 105 can be used to generate control flux 115 (block 335), which can be communicated to a control magnetic circuit of electromagnetic actuator 100 (block 340). Bias fluxes 120a,b are generated at block 325 in a manner such that the sum of two fluxes always remains constant and are communicated about a bias magnetic circuit in electromagnetic actuator 100 (330). In embodiments, in the air gap 135a, the control flux 115 is subtracted from the bias flux 120a, while in the air gap 135b the control flux 115 is added to the bias flux 120b (block 350). The force $F_z$ 145 generated is known to be proportional to the difference of the total flux densities in the air gaps $\Delta B$ 245 (block 360). The difference of the total flux densities in the air gaps $\Delta B$ 245 is measured at block 350 and used to generate the feedback signal $U_B$ 240 (block 360), which is communicated to the control electronics 202 to be compared with command signal $U_{com}$ 230 (block 310).

Figure 4:
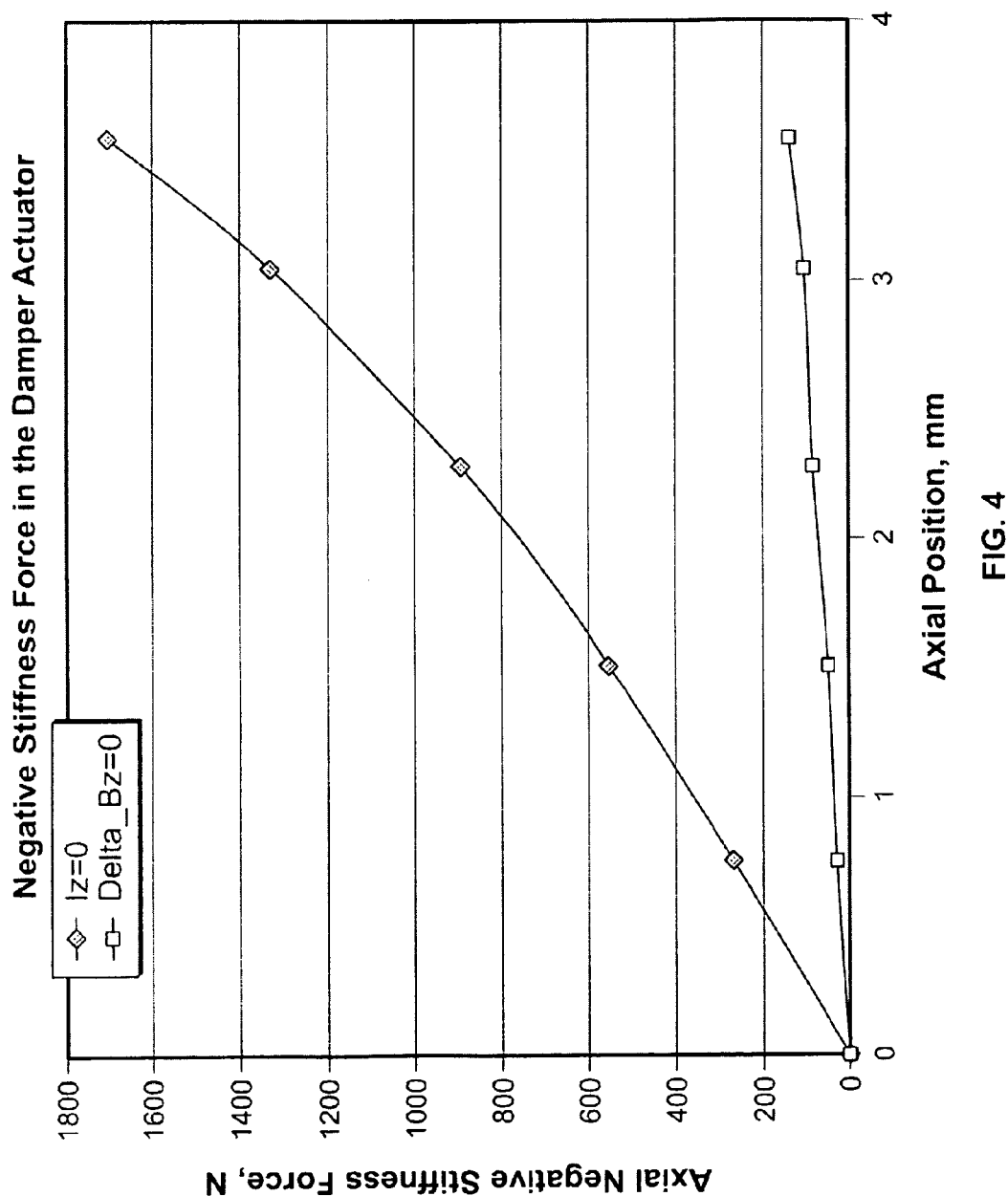
FIG. 4 is a graph representing an example of reducing the negative stiffness forces developing in the axial actuator shown in FIG. 1 with flux-feedback control compared to the conventional current control.

FIG. 4 illustrates reduction of the negative stiffness forces generated in the actuator 100 used in the flux-feedback mode when the difference in the flux densities 245 on the opposite sides of the actuator target 140 ($\Delta B = B_2 - B_1$) is controlled to zero compared to the conventional current-control mode when the actuator current $I_c$ 105 is kept at zero. In the first case, the current $I_c$ 105 is continuously adjusted by the control loop shown in FIG. 2 to keep $\Delta B = B_2 - B_1$ 245 at zero level regardless of the axial position Z of the actuator target 140. Since according to equation (3) the force $F_Z$ 145 is proportional to $\Delta B$ 245, force $F_Z$ 145 can be kept close to zero regardless of the axial position Z of the actuator target 140. In other words, the actuator negative stiffness is essentially eliminated, which may be important in a system where the actuator works in a tandem with a passive axial magnetic bearing exhibiting rather limited positive axial stiffness. In the second case, when the current $I_c$ 105 was kept at zero (conventional mode of operation) instead of being dynamically adjusted, displacements Z were causing significant increase in the force $F_Z$ 145.

Figure 5A:
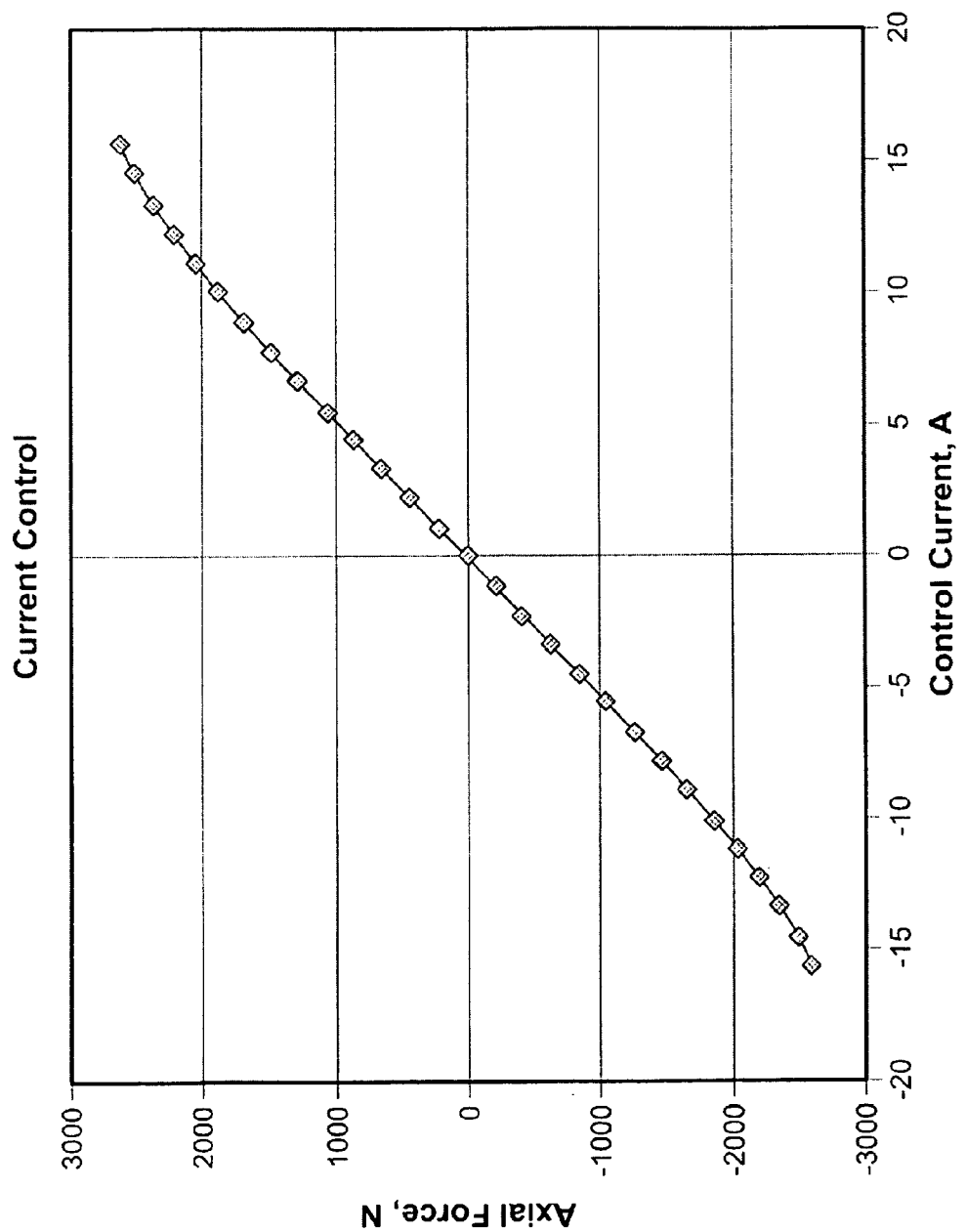
FIGS. 5a-b are graphs representing an example of improving the linearity of the Force versus Command dependence in the axial actuator shown in FIG. 1 with the flux-feedback control compared to the conventional current control.
Figure 5B:
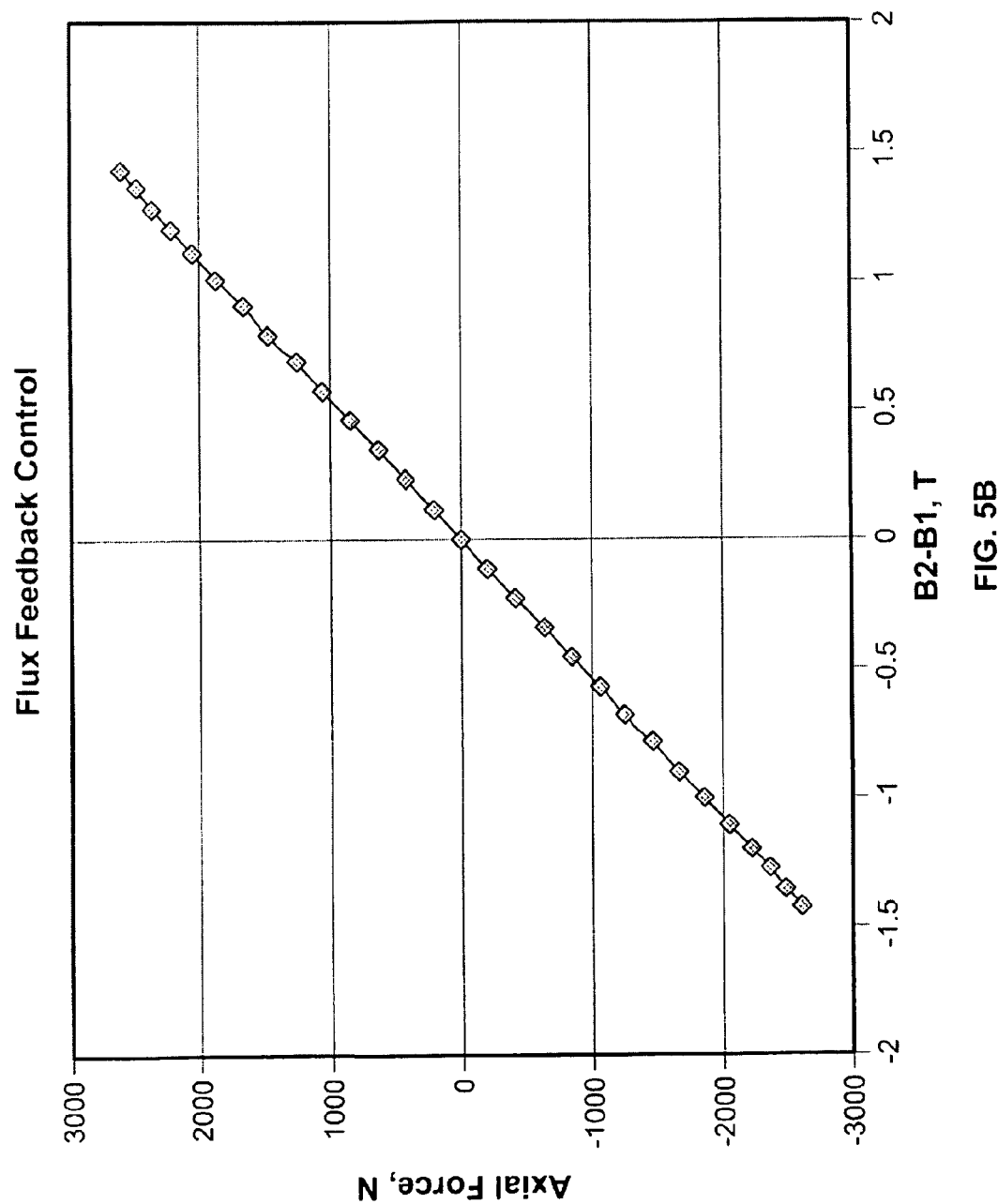

FIGS. 5a-b illustrate that a more linear relationship between the output force and the command can be achieved by the electromagnetic actuator with the flux-feedback control compared to a conventional current-controlled actuator. FIG. 5a is a graph representing an example of the force versus current dependence in an axial electromagnetic actuator similar to the one shown in FIG. 1. When a larger control current 105 is applied in order to produce a larger force 145, a larger portion of the MMF associated with this current drops inside the soft-magnetic (iron) parts of the control flux path including the poles 110a and 110b, axial backiron 190 and the actuator target 140 due to a non-linear character of the iron magnetization curve. Therefore, the force versus current curve is inherently non-linear and rolls off at high values of the control current. This significantly complicates controls if the actuator is used, for example, as a part of an Active Magnetic Bearing (AMB) system.

In contrast, the relationship between the force 145 acting on the actuator target 140 and the difference in magnetic flux densities measured in the air gaps 135b and 135a ($\Delta B = B_2 - B_1$) remains linear regardless of the force value as can be seen on the right graph in FIG. 5b. The closed flux-feedback control loop shown in FIG. 2 makes the difference $\Delta B = B_2 - B_1$ to be proportional to the command input $U_{com}$. Therefore, the force 145 generated by the actuator in this case will also be a linear function of $U_{com}$.

FIGS. 6a-b and 7a-b illustrate yet another advantage of the electromagnetic actuator with the flux-feedback control—minimizing effects of the system dynamics. It is a common approach to evaluate effects of the system dynamics by assuming that the system is excited by a harmonic function at a certain frequency f. A more complicated periodic excitation can be represented as a superposition of multiple harmonic excitations with various frequencies (Fourier series). For simplicity, it is also common to assume when analyzing the effects of the system dynamics that all relationships represented by the blocks in FIG. 2 are linear. In this case all signal responses to a particular excitation at a frequency f will be also harmonic functions at the same frequency f and behavior of each block in FIG. 2 at a particular frequency can be described by a complex number $A(f)e^{j\phi(f)}$ where $A(f)$ is the block gain (ratio between the amplitudes of the output and input signals), $\phi(f)$ is the phase shift between the amplitudes of the output and input signals and $j=\sqrt{-1}$. Two frequency-dependent functions $A(f)$ and $\phi(f)$ are collectively referred to as a block transfer function. A system response to more complicated non-harmonic excitations will be a superposition of the system responses to individual Fourier components of the excitation signals.

Figure 6A:
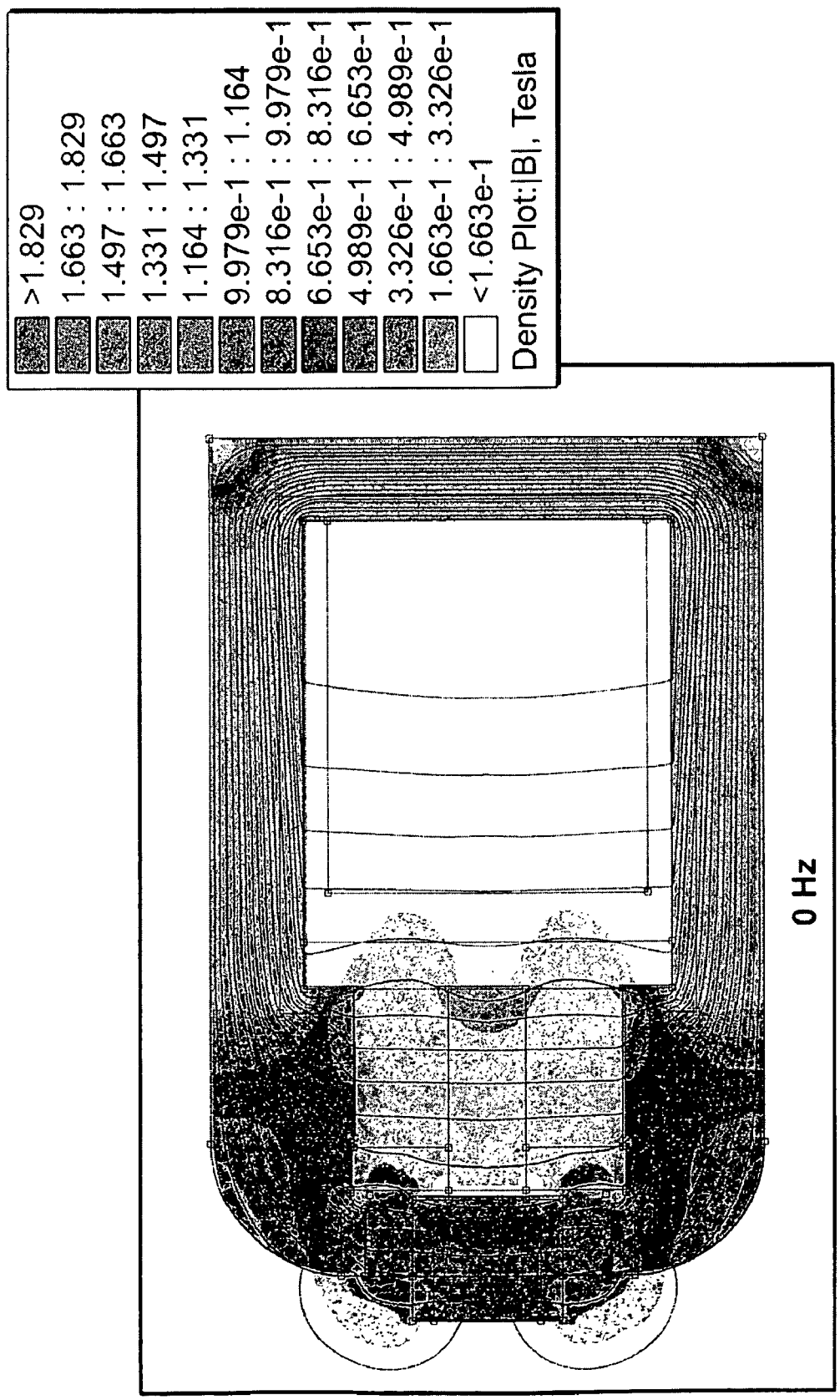
FIGS. 6a-b are schematics illustrating an effect of the signal frequency on the magnetic flux distribution in the axial actuator shown in FIG. 1.
Figure 6B:
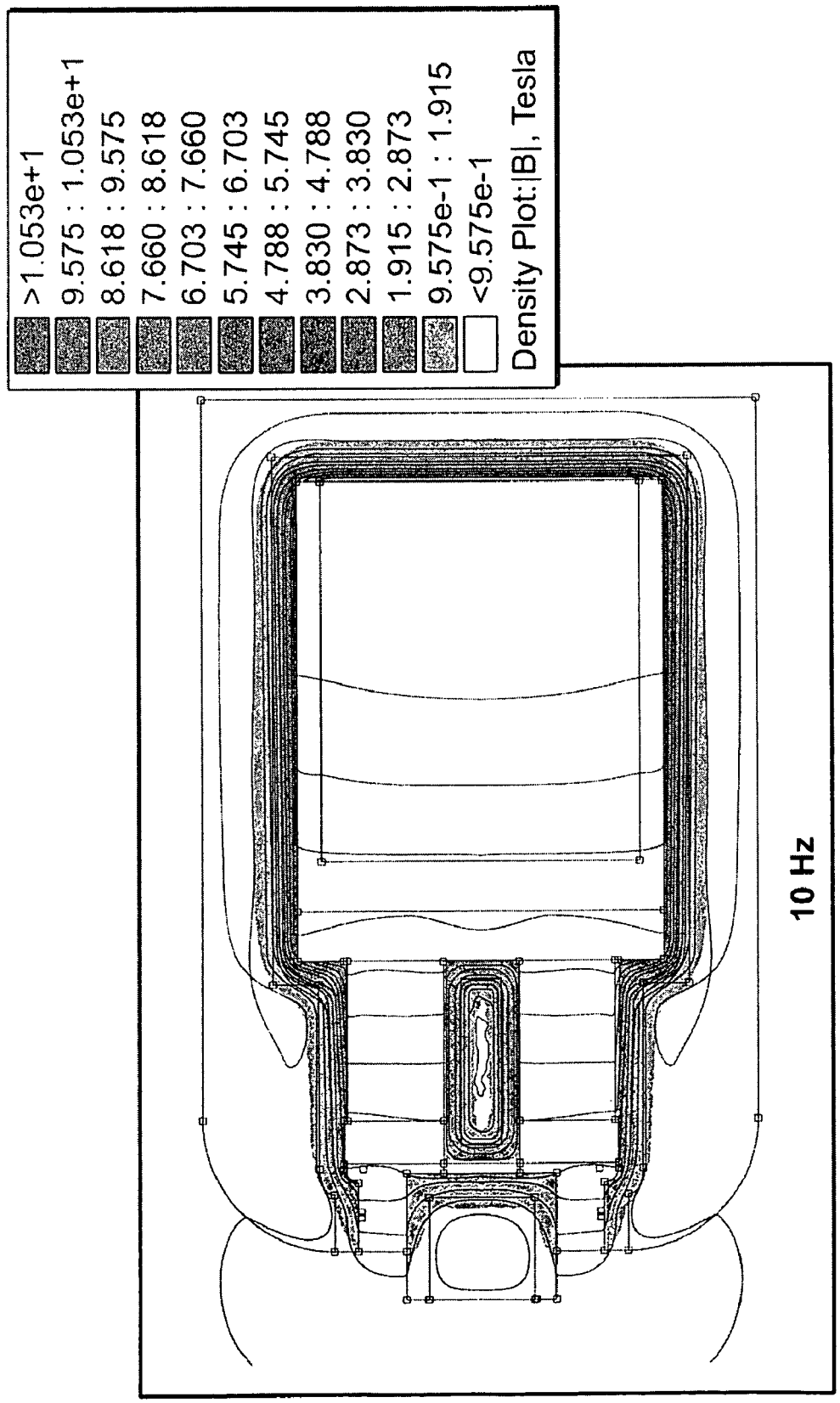

Since in some cases, for example, in axial electromagnetic actuators such as the one shown in FIG. 1, some parts of the magnetic control flux path cannot be made laminated. At relatively high frequencies the magnetic flux in these parts will be constrained to thin layers adjacent to the surfaces of the non-laminated parts. This phenomenon is known as a "skin effect" and is caused by the presence of eddy currents induced in the conductive materials used to carry the magnetic flux, such as iron. As an example, FIGS. 6a-b compare distributions of the magnetic control flux in the actuator shown in FIG. 1 at 0 Hz (left) and at 10 Hz (right). While at 0 Hz the magnetic flux flows through the entire sections of the poles 110a, 110b, the target 140 and the axial backiron 190, at 10 Hz it is constrained to thin layers adjacent to the surfaces of these parts. As a result, less flux is generated in the axial gaps at 10 Hz than at 0 Hz even though the same control current amplitude is used.

Figure 7A:
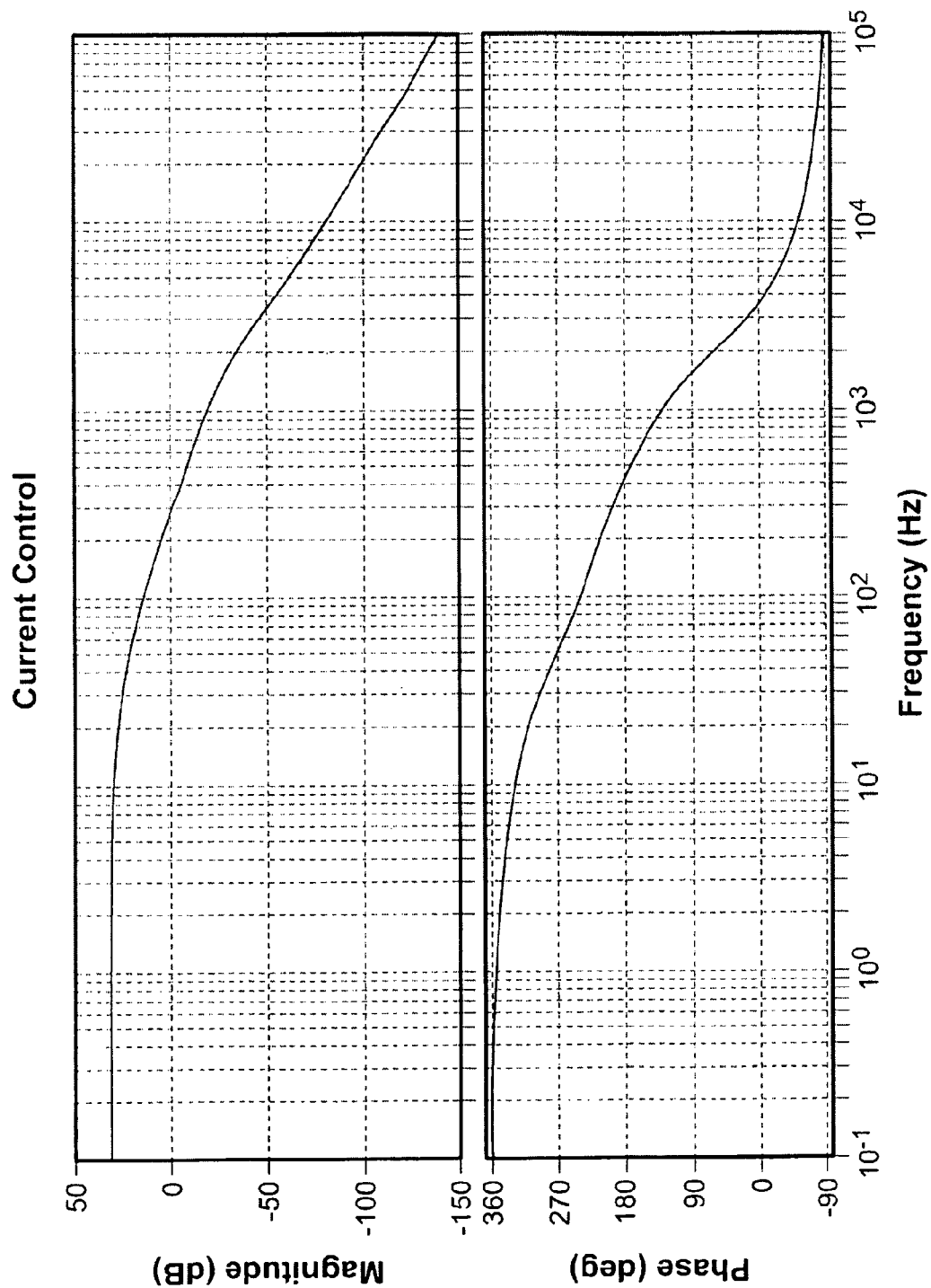
FIGS. 7a-b are graphs representing an example of improving the transfer function uniformity in the axial actuator shown in FIG. 1 with flux-feedback control compared to the conventional current control.
Figure 7B:
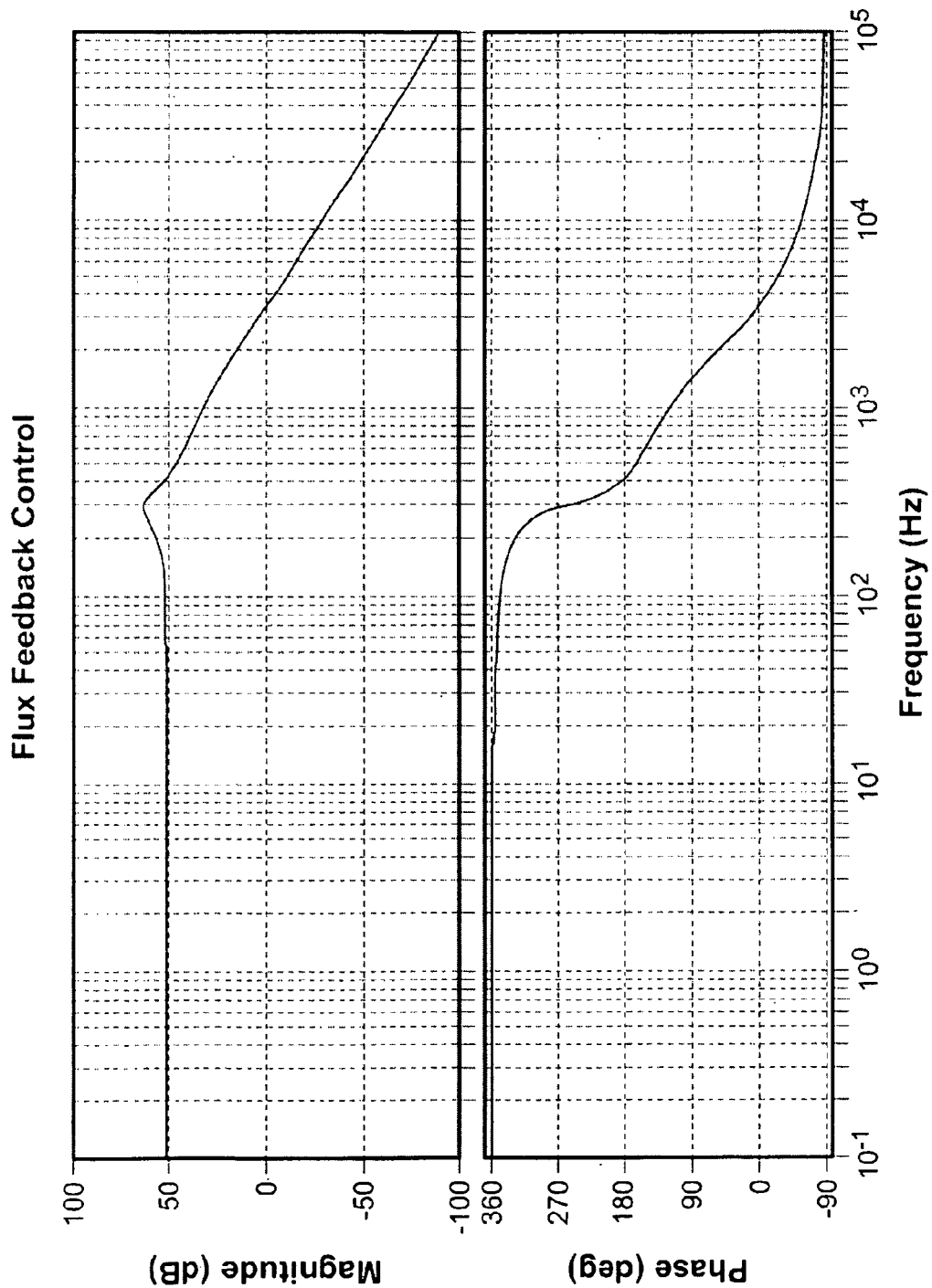

It can be noticed, however, that even though the magnetic flux distribution becomes very non-uniform inside the iron at high frequencies, it remains rather uniform inside the air gaps. Therefore, knowing $\Delta B=B_2-B_1$ will still allow a rather accurate prediction of the axial force exerted on the actuator target. In addition to the gain rolloff, eddy currents also cause a phase lag between the control current and the control flux (and, consequently, the output force), which further complicates the system control. Using the flux feedback allows reducing negative effects of both the gain and phase rolloff in the actuator transfer functions caused by the eddy currents. FIGS. 7a-b compare the damper actuator transfer functions calculated for the conventional current control and the flux feedback controls. It can be noticed that in the flux feedback mode, both gain and phase stay nearly constant up to 100 Hz, whereas in the conventional current-control mode there would be significant losses of both the gain and the phase.

Figure 8:
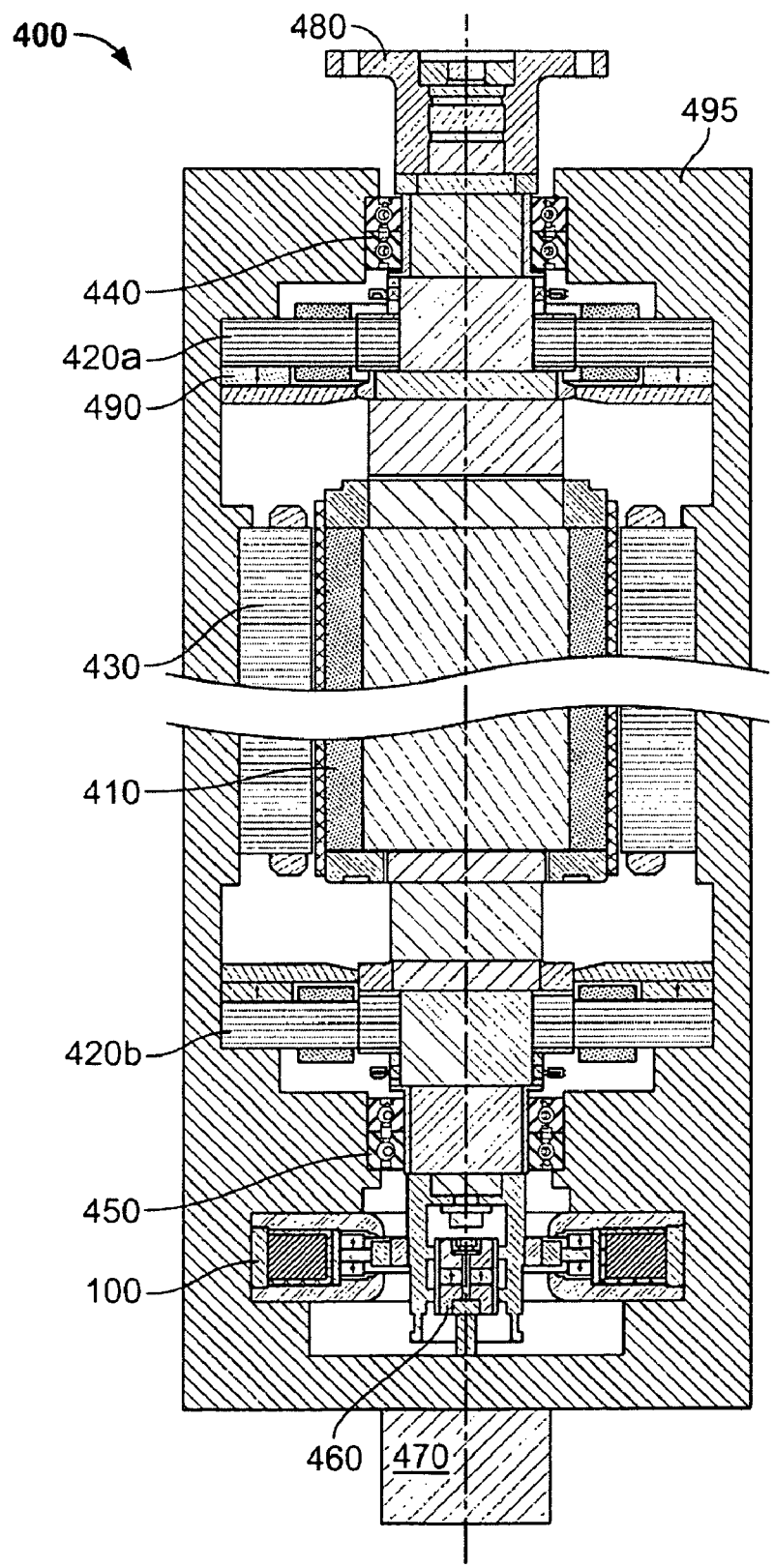
FIG. 8 is a schematic depicting a side cross-sectional view of an example rotational electric machine configured with an embodiment of the electromagnetic actuator with flux feedback control.

In some aspects, the electromagnetic actuator 100 may be utilized as a part of a damper. FIG. 8 shows an example of using an axial electromagnetic actuator with flux feedback 100 in combination with the velocity sensor 460 and electronics 470 to damp axial oscillations of the rotor 410 in an electric rotational machine 400. For example, the actuator 100 may be augmented with a device to produce the command voltage $U_{com}$ in FIGS. 2-3 proportional to the negative of the axial velocity of the rotor, (e.g., $U_{com}=-Kv_z=-K\dot{Z}$). In this case, $F_Z$ 145 may be proportional or substantially proportional (subject to the control accuracy) to $-v_z$, as may be expected from a damper.

In some implementations, an electromagnetic actuator with flux feedback control may be applied in combination with a linear velocity sensor to form an active damper that may be used in combination with a passive magnetic bearing. Also, in some implementations, a coupled motor/generator, or other machine utilizing passive magnetic bearings, may utilize one or more electromagnetic actuators in accordance with the present disclosure. In some implementations, an electromagnetic actuator with flux feedback control may be applied in combination with position sensors to form an active magnetic bearing with improved performance.

The electric machine 400 shown in FIG. 8 has a rotor 410 and a stator 430. In embodiments, the rotor 410 of the electric machine 400 is supported radially without mechanical contact by means of front and rear radial Active Magnetic Bearings (AMBs) 420a and 420b. The front AMB 420a also provides some passive axial rotor alignment using the interaction between parts of a magnetic circuit mounted on the rotating and stationary parts of the AMB 420a, which is energized with a permanent magnet 490 within the stator of AMB 420a. This alignment is typically needed for testing and commissioning prior to installation. When installed, the rotor 410 of the electric machine 400 will be coupled through a coupling 480 mounted on the right end of the rotor 410 to a shaft of another piece of equipment (not shown) driven by (in the case of a motor) or driving (in the case of a generator) the electric machine 400. In this case, the coupling 480 (and the equipment coupled to the rotor 410 by the coupling) will dictate the axial position of the rotor 410. The axial displacements of the rotor 410 in FIG. 8 can be fairly large; however, they still have some limits beyond which the machine 400 (specifically AMBs 420a,b) would not operate properly. With this in regard, non-magnetic thrust and radial backup bearings 440 are installed on the front end of the machine 400 to prevent the rotor 410 from moving beyond tolerable limits of the axial displacements. The thrust and radial backup bearings 440 also function to support the rotor 410 radially along with a rear non-magnetic radial backup bearing 450 when AMBs 420a,b are inactive.

Eliminating mechanical contact by using magnetic bearings allows the machine 400 to operate at very high rotational speeds without wear, tear, and overheating. The problem is, however, that the rotor 410 floating in space without friction is very responsive to even small axial vibrations of the equipment it is coupled to. Using an AMB to control axial movement of the rotor, however, significantly increases the cost and complexity of the machine 400, as well as imposes much stricter requirements on the axial alignment between the rotors 410 of the electric machine 400 and the coupled equipment. Thus, as described herein, employing the axial actuator 100 with flux feedback, in combination with the axial velocity sensor 460, provides an economical and relatively simple way of measuring and damping even small axial vibrations of the equipment.

In embodiments, to suppress possible axial vibrations of the electric machine rotor 410, the axial damper actuator 100 and velocity sensor 460 may be installed on the free (i.e., not coupled) rear end of the rotor in FIG. 8. A control electronics (e.g., similar to control electronics 202) is also provided housed within electronics module 470, which is fixed in relation to the stationary components of the electric machine 400 (e.g., the stator 430 and housing 495 of the electric machine). Whenever there is an axial velocity of the rotor v, the axial velocity sensor 460 generates a voltage $U_{com}=-Kv$ proportional to this velocity with the inverse sign. This voltage is then input into the current amplifier, which generates a current $I_c$ 105 in the control winding of the axial damper actuator proportional to $U_{com}$ 230. The latter, in its turns, exerts an axial damping force $F_d$ on the rotor of the electric machine proportional to $I_c$ 105, and, consequently, proportional to −v with some proportionality coefficient C (damping coefficient):

$$F_d = -Cv.$$

$F_d$ substantially damps axial movement of the rotor 410.

Because the positive axial stiffness introduced by either the coupling 480 or by AMB 420a is typically very small, the damper actuator 100 may not exhibit a large negative axial stiffness typical for conventional electromagnetic actuators used in AMB. Using the flux feedback allows significant reduction of the negative stiffness exerted by the actuator, which makes the arrangement shown in FIG. 8 feasible.

FIG. 9 shows amplitudes of the axial oscillations of the rotor 410 resulting from the axial oscillations of a coupled rotor of a driving/driven equipment with a 0.01 inch amplitude with and without the axial electromagnetic damping.

Figures 10A, 10B:
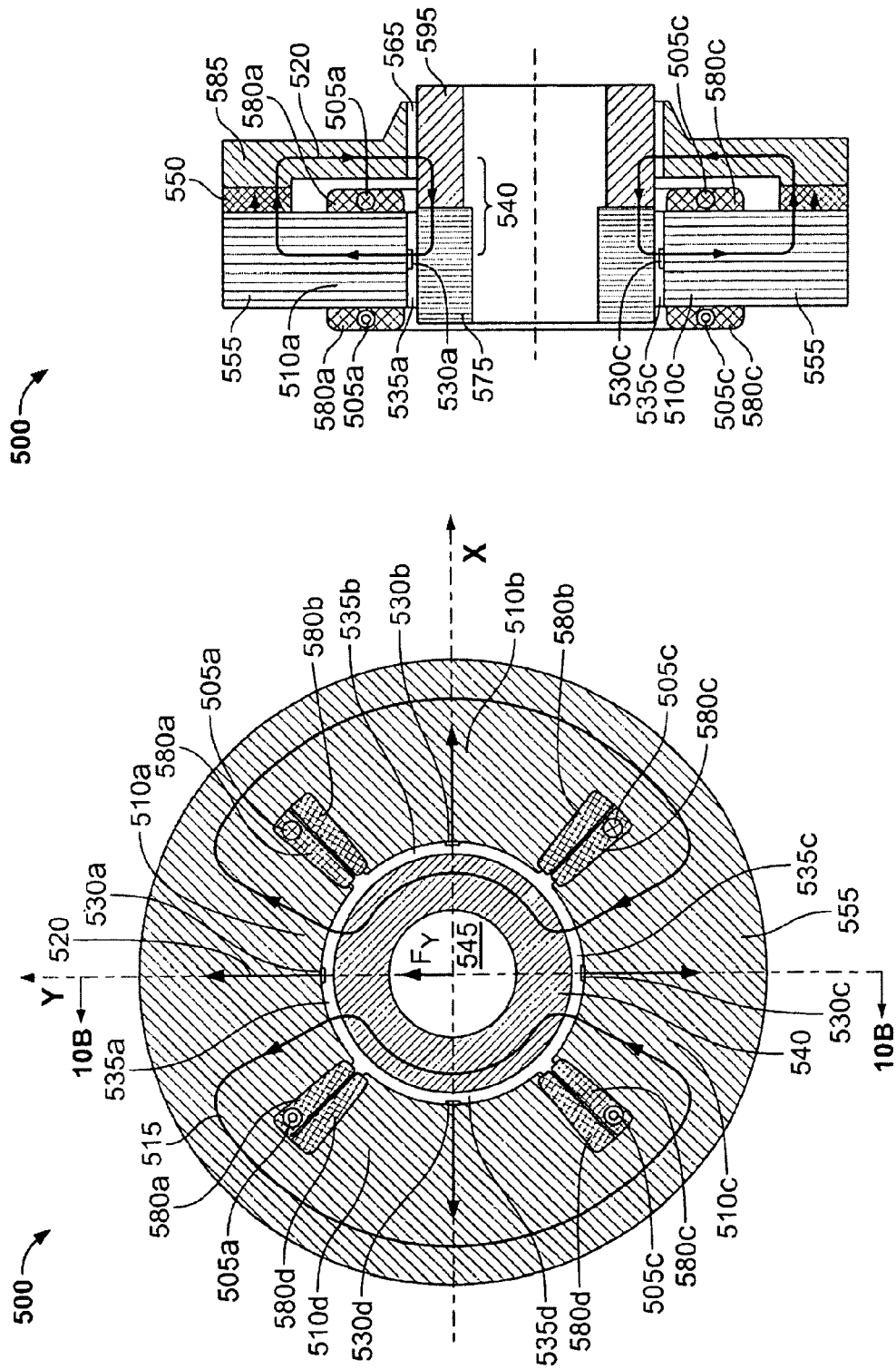
FIGS. 10a-b are schematics illustrating at least a portion of a radial electromagnetic actuator in accordance with the present disclosure.

Even though the discussion so far had been limited to axial actuators, the proposed flux feedback principle can be applied to rotational systems, as well. For example, FIGS. 10a-b show an embodiment of a radial homopolar permanent magnet-biased electromagnetic actuator with flux feedback 500. The actuator serves to exert a radial force 545 on the actuator target 540 mounted on a rotor (not shown). In some cases, the target 540 can be composed of two parts: 575 and 595 with the first target section 575 being assembled of insulated steel laminations stacked in the axial direction, whereas the second target section 595 can be a solid piece of steel. In some other cases, the second target section 595 can be an integral part of the rotor.

The first target section 575 can be surrounded by a stator 555 including four individual active control poles 510a through 510d separated by slots on the inner diameter and magnetically connected on the outer diameter. Control coil 580a-d can be located in the slots between the poles and wrapped around the corresponding poles. One pole of the permanent magnet 550 can be attached to the stator 555, whereas the other pole of the magnet 550 can be attached to the passive radial pole 585. All active poles 510a through 510d can be separated from the actuator target by radial gaps 535a through 535d. The passive pole 585 can also be separated from the actuator target by a radial gap 565. The actuator target 540 can, therefore, be maintained in a non-contact relationship with respect to the stationary part of the assembly. The permanent magnet 550 can generate a bias magnetic flux 520 flowing inside the passive pole 585 towards the portion of the actuator target 595, crossing the air gap 565, entering the portion of the actuator target 595, traveling axially towards the portion of the actuator target 575, exiting the portion of the actuator target 575 radially, crossing the air gaps 535a through 535d, entering the stator 555 and closing the loop. In each of the radial control poles 510a through 510d, the bias flux 520 can be directed in the same way, for example, radially outwards in FIG. 10a. If a radial force needs to be produced along either X or Y axes, two diametrically opposite coils wrapped around the radial control poles aligned with the corresponding axis need to be energized. For example, to produce a positive force in the Y direction, two coils 580a and 580c have to be energized with currents 505a and 505c directed as shown in FIGS. 10a-b. These currents may produce a control flux 515 that, for example, adds to the bias flux 520 in the upper pole 510a and subtracts from it in the lower pole 510c. This results in a higher flux density in the upper air gap 535a and a lower flux density in the lower air gap 535c. As a result, there will be a force $F_Y$ 545 exerted on the actuator target 540 in the positive Y (upwards in FIG. 10).

In embodiments, magnetic field sensors 530a through 530d can be placed in each radial air gap 535a through 535d. The sum of the bias fluxes through poles 510a through 510d can be maintained constant in the radial actuator shown in FIGS. 10a-b by saturating the passive radial pole 585. Furthermore, a displacement of the actuator target 540 along one of the axes (e.g., X axis) would not affect the total flux through the poles associated with the other axes (e.g., poles 510a and 510c aligned with the Y axis). This is because the sum of the magnetic reluctances of the air gaps 535b and 535d can stay approximately constant regardless of the position of the actuator target 540 along the X axis. The fluxes in each gap 535b and 535d, however, may not stay constant if the actuator target 540 is shifted in the X direction. For example, if it is shifted in the positive X direction, there can be more flux (higher flux density) in the air gap 535b than in the air gap 535d, and, consequently, there may be a force acting on the actuator target 540 further in the positive X direction (negative stiffness force).

Similarly, if the actuator target is shifted in the positive Y direction, there may be more flux (higher flux density) in the upper air gap 535a and less flux (i.e., lower flux density) in the lower air gap 535c. The total flux, and, consequently, the sum of the flux densities in the air gaps 535a and 535c, nevertheless, will remain constant. This situation is analogous to the previously analyzed case of the axial actuator shown in FIG. 1 where the sum of the bias flux densities in the air gaps 135a and 135b remained constant, whereas the flux densities in each individual gap could vary. Therefore, designating the bias flux density and the total flux density in the air gap 535a as $B_{b2}$ and $B_2$ respectively, and designating the bias flux density and the total flux density in the air gap 535c as $B_{b1}$ and $B_1$ respectively, equation (3) is applicable to calculate the force $F_Y$ 545:

$$F_Y = \frac{A}{2\mu_0}(B_{b1} + B_{b2})(B_2 - B_1) \tag{4}$$

Similar to the axial actuator, using the control loop shown in FIG. 2 may allow control of the force $F_Y$ 545 by setting the difference in flux densities $\Delta B = B_2 - B_1$ to the specified value. The values of $B_2$ and $B_1$ in this case are measured by the magnetic field sensors 530a and 530c. The same principle can be applied to the x axis.

A number of implementations have been described. Nevertheless, it will be understood that various modifications may be made. Accordingly, other implementations are within the scope of the following claims.

What is claimed is:

1. An electromagnetic actuator comprising:
a body configured to move along an axis;
a first pole adjacent and spaced apart from a first surface of the body, the first pole adapted to communicate magnetic flux with the first surface of the body;
a second pole adjacent and spaced apart from a second surface of the body, the second pole adapted to communicate magnetic flux with the second surface of the body, the body, the first pole, and the second pole magnetically coupled and defining a control magnetic circuit;
a bias pole adjacent and spaced apart from a lateral surface of the body, the bias pole adapted to communicate magnetic flux with the lateral surface of the body, the body, the first pole, and the bias pole defining a first bias magnetic circuit, and the body, the second pole, and the bias pole defining a second bias magnetic circuit;

a first flux sensor configured to measure a total magnetic flux between the first pole and the first surface of the body;

a second flux sensor configured to measure a total magnetic flux between the second pole and the second surface of the body;

a control coil in communication with the control magnetic circuit, adapted to produce a control magnetic flux in the control magnetic circuit; and a controller coupled to the control coil configured to adjust the control magnetic flux in the control magnetic circuit based on the total fluxes measured by the first and second flux sensors and a command signal.

2. The actuator of claim 1 further comprising a permanent magnet adjacent the bias pole and adapted to generate bias magnetic fluxes.

3. The actuator of claim 2 wherein the permanent magnet is a first permanent magnet adapted to generate bias magnetic flux in the first bias magnetic circuit; and further comprising a second permanent magnet adjacent the bias pole, adapted to generate bias magnetic flux in the second bias magnetic circuit.

4. The actuator of claim 1 wherein the body comprises a low reluctance target adapted to communicate magnetic flux.

5. The actuator of claim 1 wherein the bias pole is magnetically saturated.

6. The actuator of claim 1 wherein the controller comprises a local actuator control circuit, the local actuator control circuit adapted to adjust current in the control coil based on the total flux detected by the flux sensors and the command signal.

7. The actuator of claim 1 wherein the control magnetic flux is configured to oppose a deviation of the difference between the total fluxes measured in the first and second flux sensors from the command signal.

8. The actuator of claim 1 wherein the first and second flux sensors are Hall Effect sensors.

9. The actuator of claim 1 wherein:

the bias pole is a radial bias pole adjacent and spaced apart from the lateral surface of the body;

the first pole is a first radial pole and the first surface of the body is the lateral surface of the body, the lateral surface of the body, the first radial pole, and the radial bias pole defining the first bias magnetic circuit;

the second pole is a second radial pole diametrically opposite to the first pole and the second surface of the body is the lateral surface of the body, the lateral surface of the body, the second radial pole, and the radial bias pole defining the second bias magnetic circuit, and the first radial pole, the body and the second radial pole defining the control magnetic circuit; and further comprising a first radial control coil and a second radial control coil, the first radial control coil coiled around the first radial pole and the second radial control coil coiled around the second radial pole, the first and the second radial control coils adapted to generate control magnetic flux in the control magnetic flux circuit.

10. The actuator of claim 9 further comprising a permanent magnet adapted to generate bias magnetic flux.

11. A method for exerting a force on a moveable body, the method comprising:

communicating first bias magnetic flux through a first surface of the body;

communicating second bias magnetic flux through a second surface of the body;

communicating a control magnetic flux through the first and second surfaces of the body;

measuring the fluxes communicated through the first and second surfaces; and adjusting the control magnetic flux based on the measured fluxes and a command signal.

12. The method of claim 11 wherein the control magnetic flux is adjusted based on the measured difference of the total fluxes and the command signal.

13. The method of claim 11 wherein the control magnetic flux is adjusted proportionally to the measured difference of the total fluxes communicated through the first and second surfaces.

14. The method of claim 11 wherein adjusting the control magnetic flux based on the measured fluxes communicated through the first and second surfaces comprises:

receiving the command signal;

measuring a difference between the total fluxes through the first and second surfaces;

generating an input signal for a current amplifier as a function of the difference between the command signal and the measured difference between the total fluxes through the first and second poles;

generating a current corresponding to the input signal for the current amplifier; and generating a control magnetic flux from the current, the control magnetic flux adapted to oppose a deviation of the difference between the total fluxes measured in the first and second poles from the command signal.

15. The method of claim 14 wherein the command signal is made proportional to a velocity of the body with the opposite sign in order to produce a damping force.

16. An electric machine system, the system comprising:

a first assembly that moves in relation to a second assembly along an axis of movement;

a first structure fixed in relation to the second assembly, and adjacent and spaced apart from a first face of the first assembly, the first structure magnetically coupled with the first face of the first assembly;

a second structure fixed in relation to the second assembly, and adjacent and spaced apart from a second face of the first assembly, the second structure magnetically coupled with the second face of the first assembly, the first assembly, the first structure, and the second structure defining a control magnetic circuit;

a conductive coil fixed in relation to the second assembly and adapted to produce a magnetic flux in the control magnetic circuit;

a soft-magnetic pole adjacent and spaced apart from a surface of the first assembly, the soft-magnetic pole magnetically coupled with the surface of the first assembly, the first assembly, the first structure, and the soft-magnetic pole defining a first bias magnetic circuit, and the first assembly, the second structure, and the soft-magnetic pole defining a second bias magnetic circuit;

a permanent magnet adjacent the soft-magnetic pole, adapted to generate bias magnetic flux;

a first sensor configured to measure a first total magnetic flux, the first total magnetic flux corresponding to a sum of the control magnetic flux and a first bias magnetic flux in the first bias magnetic circuit;

a second sensor configured to measure a second total magnetic flux, the second total magnetic flux corresponding to a sum of the control magnetic flux and a second bias magnetic flux in the second bias magnetic circuit; and an electronics module configured to control current in the conductive coil to adjust the magnetic flux in the control magnetic circuit based on the total fluxes measured by the first and second flux sensors and a command.

17. The system of claim 16, wherein the electronic module adjusts the magnetic flux in the control magnetic circuit to oppose a deviation of the difference between the total fluxes measured in the first and second structures from the command signal.

18. The system of claim 16, wherein the first assembly is a rotor that rotates about the axis of movement and the second assembly is a stator.

19. The system of claim 16, further comprising a velocity sensor in communication with the electronics module, the velocity sensor being fixed in relation to the second assembly; and wherein the electronics module is adapted to receive a signal from the velocity sensor corresponding to a velocity of the first assembly.

20. The system of claim 16, wherein the first sensor is adjacent the first structure and the first face of the first assembly; and wherein the second sensor is adjacent the second structure and the second face of the first assembly.

* * * * *